US012756969B2

(12) United States Patent
Park et al.

(10) Patent No.: US 12,756,969 B2
(45) Date of Patent: Oct. 6, 2026

(54) TWS INCLUDING PLANAR SPEAKER INCORPORATING CIRCUIT-EMBEDDED VIBRATOR, DYNAMIC SPEAKER, AND MICROPHONE

(71) Applicant: BUJEON CO., LTD., Ansan-si (KR)

(72) Inventors: Minkoo Park, Hwaseong-si (KR); Seungwoo Chun, Hwaseong-si (KR); Donghyun Cho, Hwaseong-si (KR)

( * ) Notice: Subject to any disclaimer, the term of this patent is extended or adjusted under 35 U.S.C. 154(b) by 220 days.

(21) Appl. No.: 18/631,398

(22) Filed: Apr. 10, 2024

(65) Prior Publication Data

US 2024/0365046 A1 Oct. 31, 2024

(30) Foreign Application Priority Data

Apr. 28, 2023 (KR) ........................ 10-2023-0056494

(51) Int. Cl.

| | |
|---|---|
| ***H04R 1/24*** | (2006.01) |
| ***H04R 1/02*** | (2006.01) |
| ***H04R 1/08*** | (2006.01) |
| ***H04R 9/06*** | (2006.01) |

(52) U.S. Cl.

CPC ............... *H04R 1/24* (2013.01); *H04R 1/025* (2013.01); *H04R 1/08* (2013.01); *H04R 9/06* (2013.01); *H04R 2420/07* (2013.01)

(58) Field of Classification Search

CPC . H04R 1/24; H04R 1/025; H04R 1/08; H04R 9/06; H04R 2420/07; H04R 1/26; H04R 2400/03; H04R 7/04; H04R 1/1083; H04R 9/02; H04R 2410/05; H04R 2460/01

See application file for complete search history.

(56) References Cited

U.S. PATENT DOCUMENTS

| | | | | |
|---|---|---|---|---|
| 5,182,774 | A * | 1/1993 | Bourk | H04R 1/1083 381/372 |
| 6,760,462 | B1 * | 7/2004 | Thigpen | H04R 9/047 381/431 |
| 8,031,901 | B2 * | 10/2011 | Levitsky | H04R 9/047 381/399 |
| 10,540,955 | B1 * | 1/2020 | Milani | H04R 1/1083 |
| 2007/0127767 | A1 * | 6/2007 | Croft | H04R 9/047 381/431 |
| 2019/0342651 | A1 * | 11/2019 | Howell | H04R 1/1041 |
| 2021/0377668 | A1 * | 12/2021 | Park | H04R 1/44 |
| 2025/0030974 | A1 * | 1/2025 | Zhang | H04R 1/24 |

FOREIGN PATENT DOCUMENTS

| | | |
|---|---|---|
| KR | 10-2018-0057045 A | 5/2018 |
| KR | 10-2022-0121593 A | 9/2022 |

* cited by examiner

*Primary Examiner* — Akelaw Teshale

(74) *Attorney, Agent, or Firm* — KORUS Patent, LLC; Seong Il Jeong

(57) ABSTRACT

The present invention provides a TWS including a dynamic driver configured to emit woofer sound, a planar speaker configured to emit tweeter sound, and a microphone configured to mute external sound.

2 Claims, 8 Drawing Sheets

TWS INCLUDING PLANAR SPEAKER INCORPORATING CIRCUIT-EMBEDDED VIBRATOR, DYNAMIC SPEAKER, AND MICROPHONE

CROSS-REFERENCE TO RELATED APPLICATION

This application claims the benefit of Korean Patent Application No. 10-2023-0056494 filed on Apr. 28, 2023, which is hereby incorporated by reference herein in its entirety.

BACKGROUND

1. Technical Field

The present invention relates to a true wireless speaker (TWS) including a planar speaker incorporating circuit-embedded vibrator, a dynamic speaker, and a microphone.

2. Description of the Related Art

In a speaker, a diaphragm or vibrator is an essential component of a driver, and is usually mounted with a voice coil on the bottom thereof, so that they take up a considerable amount of space in the speaker. Some vibrators used in smartphones use a planar diaphragm to reduce the total height of a speaker (see Korean Patent No. 10-1727429). Additionally, there is a technology that reduces the overall height by fabricating a voice coil in a planar shape (see Korean Patent No. 10-1765679).

Korean Patent Application Publication No. 10-2013-81803 discloses a diaphragm provided with a circuit in a planar speaker. However, there are disadvantages in that a magnet is disposed in a bar shape across the center portion of the diaphragm and there is no room for the up and down vibration of the diaphragm, so that the volume of the speaker cannot be adjusted.

In order to avoid these disadvantages, the applicant has proposed, in Korean Patent Application No. 10-2023-0048707, a speaker module, including a conductor, a magnet located beneath the conductor, and a vibrator located beneath the magnet, wherein a circuit performing the function of a voice is formed on the vibrator.

The present invention was filed based on this preceding application with the intention of improving a TWS (a true wireless speaker) in particular.

SUMMARY

Therefore, an object of the present invention is to provide a TWS speaker that can reduce the volume of the speaker and also secure excellent sound by using a vibrator, including a circuit, as a basic module.

In order to accomplish the above object, the present invention provides a TWS, including a dynamic driver configured to emit woofer sound, a planar speaker configured to emit tweeter sound, and a microphone configured to mute external sound.

The planer speaker may be disposed in front of the woofer diaphragm of the dynamic driver, so that the woofer sound is emitted through the planar speaker, and the microphone may be disposed adjacent to the planar speaker at a location that does not interfere with the sound emission portion of the housing of the TWS.

The planer speaker may be mounted on a separation plate having a woofer sound passage in front of the woofer diaphragm of the dynamic driver, the emission paths of the woofer sound and the tweeter sound may be separated from each other, and the microphone may be disposed at a location that does not interfere with the sound emission portion of the housing of the TWS.

The planer speaker may be mounted at a location that covers a part of the inlet of the sound emission portion of the housing of the TWS, the microphone may be mounted to cover another part of the inlet of the sound emission portion, and the woofer sound may be emitted to the outside through an empty space between the planar speaker and the microphone.

The planer speaker may be airtightly mounted on the inner surface of the sound emission portion, the microphone may be mounted at a location that does not interfere with the sound emission portion, a tweeter sound passage hole and a woofer sound passage hole may be formed in the planar speaker, and woofer vibration sound may be emitted through the woofer sound passage hole and tweeter vibration sound may be emitted through the tweeter sound passage hole.

Sound flowing into the microphone may enter through the woofer sound passage hole, and may be transmitted to the microphone.

The planar speaker may include a conductor, a magnet located on one side of the conductor, and a vibrator located on one side of the magnet.

A circuit replacing a voice coil may be formed on the diaphragm.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION

Embodiments of the present invention will be described in detail below with reference to the accompanying drawings.

The descriptions related to FIGS. 1 to 4 are the same as those disclosed in preceding Korean Patent Application No. 10-2023-0048707.

Figure 1A:
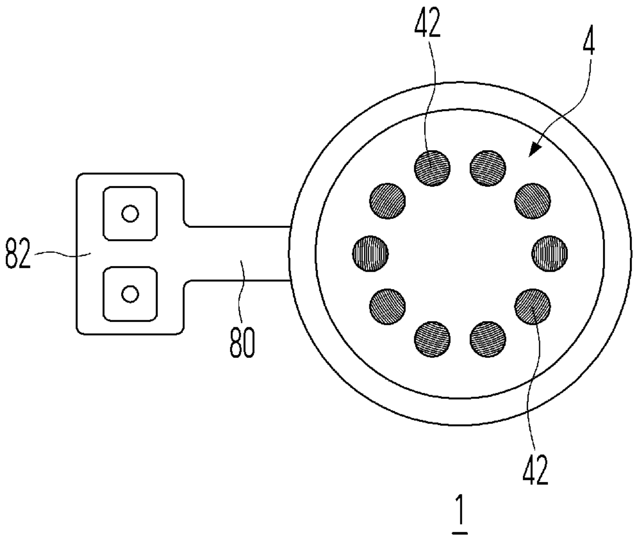
FIG. 1A is a plan view of a speaker module incorporating a circuit-embedded vibrator in the speaker of the present invention.
Figure 1B:
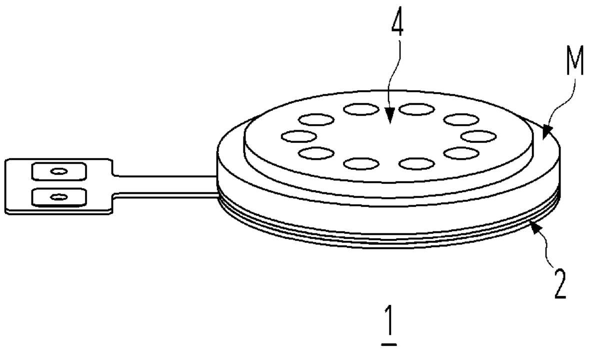
FIG. 1B is a perspective view of a speaker module incorporating a circuit-embedded vibrator in the speaker of the present invention.
Figure 2:
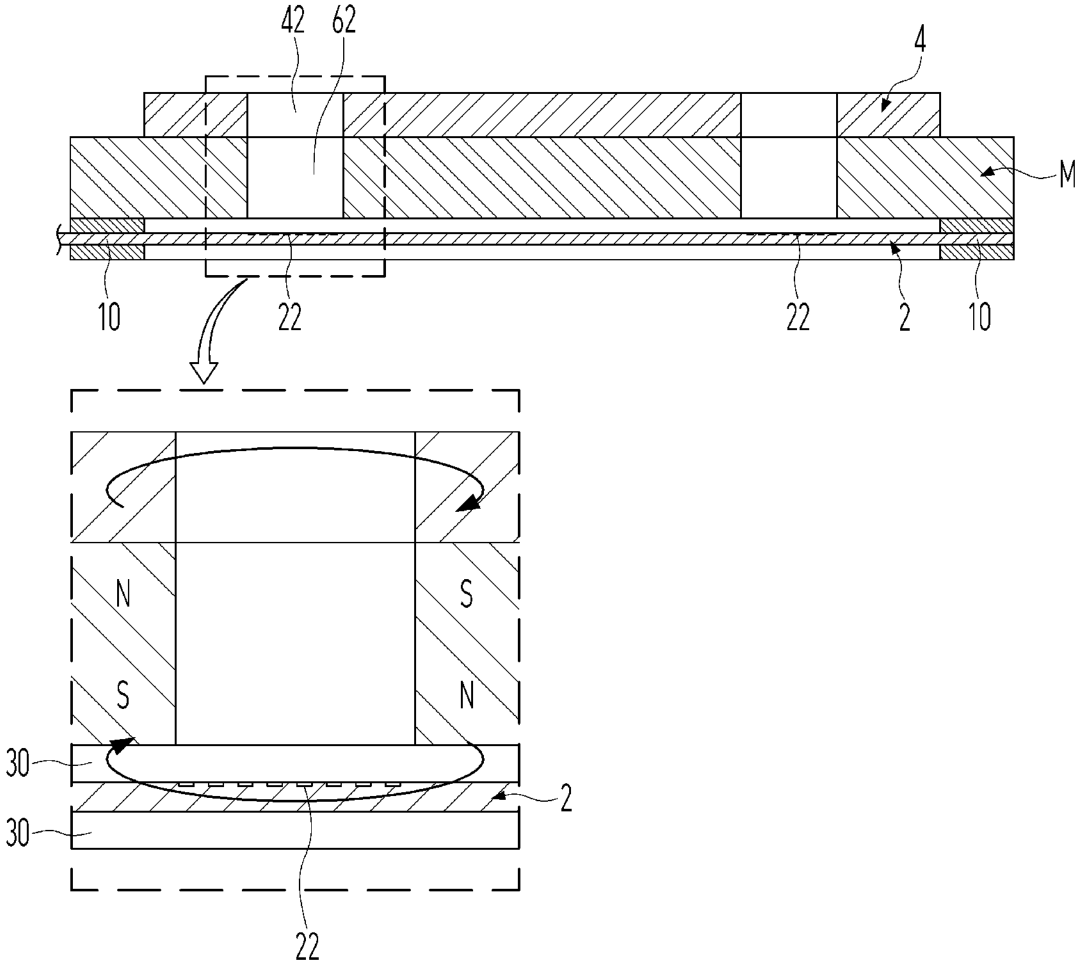
FIG. 2 is a sectional view of the speaker module of FIGS. 1A-1B.

FIG. 1A is a plan view and perspective view of a speaker module 1 incorporating a circuit-embedded vibrator in the speaker of the present invention, and FIG. 2 is a sectional view of the speaker module 1.

Referring to the two drawings together, the speaker module 1 of the present invention includes a conductor 4, a magnet M located beneath the conductor 4, and a vibrator 2 located beneath the magnet M.

The conductor 4 is made of a conductive material. In the example shown in the drawing, the conductor 4 has a disk shape, but it may be fabricated in an oval or square shape. A plurality of conductor holes 42 are formed through the conductor 4 along the height (thickness) thereof. In the example shown in the drawings, the conductor holes 42 are disposed at equal intervals along an imaginary circle having a constant diameter.

The magnet M is the same as a common magnet applied to a micro speaker. Although the magnet M is shown in the shape of a plate disk, it may be fabricated in the shape of a ring with an empty center or in the shape of a bar. A magnet hole 62 is formed through the magnet M along the height thereof. Unlike the conductor holes 42, the magnet hole 62 is a ring-shaped continuous hole, and is fabricated in a continuous ring shape that covers the openings of the conductor holes 42 in order to communicate with the individual conductor holes 42 directly and vertically. However, this is not essential, and the magnet hole 62 may be configured in various shapes and arrangements as long as it can be aligned and communicate with the conductor holes 42. The total area of the magnet M is larger than that of the conductor 4, and the magnet M has a shape that surrounds the conductor 4 when viewed in a plan view.

A circuit 22 formed on the vibrator 2 provided with the circuit of the present invention is a circuit that replaces a voice coil to implement the function of the voice coil. Since this circuit 22 is embedded in and integrated with a plate-shaped diaphragm, the height and volume of the speaker may be considerably reduced. In this respect, the speaker module 1 of the present invention is suitable for a planar speaker. The circuit 22 formed on the vibrator 2 is connected to a terminal portion 82 through an externally extending lead 80. This corresponds to the terminal of a voice coil being connected to an external terminal.

Figure 3:
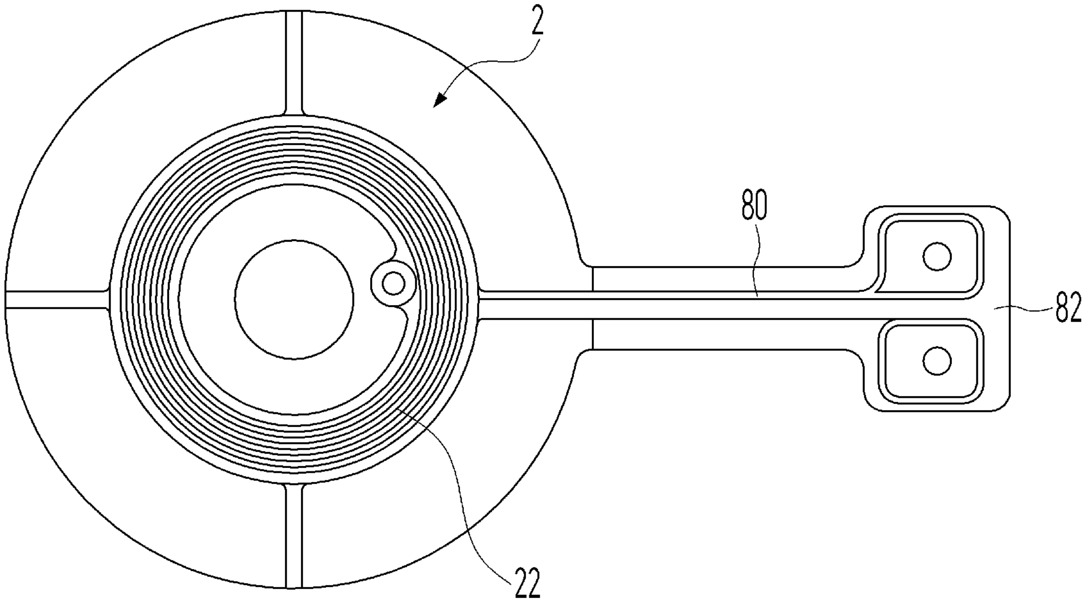
FIG. 3 is a plan view of a disc-shaped vibrator of the present invention in which a ring-shaped concentric circuit pattern is formed to form a circuit and one side of the circuit is connected to a terminal portion through a lead.

FIG. 3 is an actual photo of a state in which a ring-shaped concentric circuit pattern is formed on the disk-shaped vibrator 2 of the present invention to form the circuit 22 and one side of the circuit 22 is connected to the terminal portion 82 through the lead 80. The pattern of the circuit 22 may have various shapes and arrangements. Although the circuit 22 is generally printed on one surface (the top surface) of the vibrator 2, it may be formed on both surfaces or the bottom surface of the vibrator 2. As shown in FIG. 2, it is preferable that the circuit 22 be formed at a location directly facing the magnet hole 62 and make strong magnetic coupling with the conductor 4.

The upper and lower portions of the circumference of the vibrator 2 are securely supported by support rings 10. The remaining portion is installed at a gap 30 corresponding to a minute distance from the bottom surface of the magnet M. The gap 30 is necessary for the vertical vibration of the vibrator 2. The vibrator 2 emits vibration sound in such a manner that the remaining portion, including the central portion, vibrates while the outer surface of the vibrator 2 is firmly supported. The vibrator 2 is fabricated in a planner shape rather than a dome structure shape like a conventional diaphragm, so that the total height of the speaker can be reduced.

In the speaker module 1 of the present invention, when alternating current is applied to the circuit 22, a magnetic field is formed from the N pole to the S pole, a magnetic field is formed in the conductor 4 from the N pole to the S pole in the opposite direction, and the vibrator 2 is driven up and down according to Fleming's right hand rule, as shown in the enlarged view of FIG. 2.

Figure 4A:
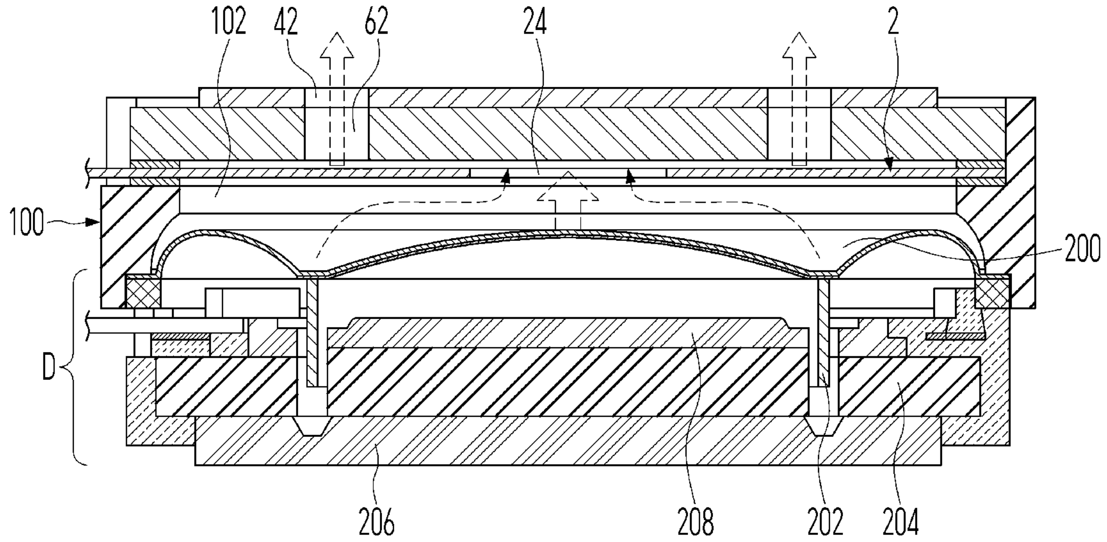
FIG. 4A is a sectional view of the assembly of a planar speaker using the speaker module of the present invention as upper and lower layers.
Figure 4B:
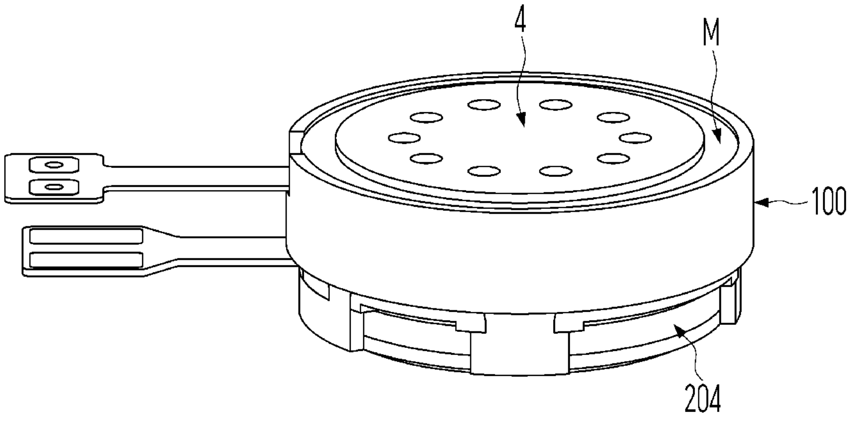
FIG. 4B is a perspective view of the assembly of a planar speaker using the speaker module of the present invention as upper and lower layers.

Next, as a TWS, a structure in which the planar speaker module 1 replaces a tweeter sound emission structure will be described with reference to FIGS. 4A-4B on the premise of a 2-way speaker that simultaneously emits woofer sound and tweeter sound. FIG. 4A is a sectional view of a 2-way speaker provided with a planar speaker module 1, and FIG. 4*b* is a perspective view of the 2-way speaker of FIG. 4A.

A woofer sound emission structure is the same as before. That is, the woofer sound emission structure is located in the lower portion of the speaker, and includes a woofer diaphragm 200, a woofer voice coil 202, a plate 208, a woofer magnet 204, and a yoke 206, as is well known. In the following description, the woofer sound emission structure will be collectively referred to as the "dynamic driver D."

A tweeter sound emission structure is installed in the upper portion of the dynamic driver D, and the conductor 4, the magnet M, and the vibrator 2 are disposed as described above. The tweeter sound emission structure and the dynamic driver D are assembled into a single body by a bracket 100. The bracket 100 surrounds the overall exterior of the speaker module 1, and the lower portion of the bracket 100 extends to support the edge dome portion of the woofer diaphragm 200. The inside of the bracket 100 is an empty space, and a bracket hole 102 is formed between the dynamic driver D and the tweeter sound emission structure and allows the two structures to communicate with each other.

The tweeter sound emission structure is the same as the speaker module 1 described above, except that a vibrator hole 24 serving as a woofer sound emission passage is formed in the center of the vibrator 2. The vibrator 2 naturally serves as a tweeter diaphragm, and the tweeter vibration sound of the vibrator 2 is emitted upward through the magnet hole 62 and the conductor holes 42. As indicated by the arrows, the woofer vibration sound of the woofer diaphragm 200 passes through the bracket hole 102 and the vibrator hole 24, then joins two-way vibration sound, and is emitted upward through the magnet hole 62 and the conductor holes 42. Therefore, a user may simultaneously hear the woofer vibration sound in the low and middle frequency range and the tweeter vibration sound in the high frequency range.

The 2-way speaker of the present invention described above falls within the concept of a combination of a woofer structure and a tweeter structure, but is characterized by proposing a new type of 2-way speaker model formed by structurally integrating the dynamic driver D representing the woofer structure and the planar speaker representing the tweeter structure.

In the 2-way speaker of the present invention, the main factors that determine the vibration sound characteristics of the woofer vibration sound are the shape and location of the vibrator hole 24 including the circuit 22. The main factors that determine the vibration sound characteristics of the tweeter vibration sound are the shapes and locations of the conductor holes 42. By appropriately changing and combining these two elements, the optimal sound may be achieved.

Next, as an improved structure of the present application, a TWS provided with a dynamic driver D, a planer speaker, and a microphone Mc will be described.

One of the features of the present invention is that the microphone may be disposed accordingly while the planar speaker is disposed to escape the constraints of the dynamic driver D by utilizing the slimness and independence of the planar speaker.

In the following drawings, the emission direction of woofer vibration sound is indicated by a solid line, the emission direction of tweeter vibration sound is indicated by a dotted line, and the sound inflow path of the microphone is indicated by a dash and two-dot line.

Figure 5:
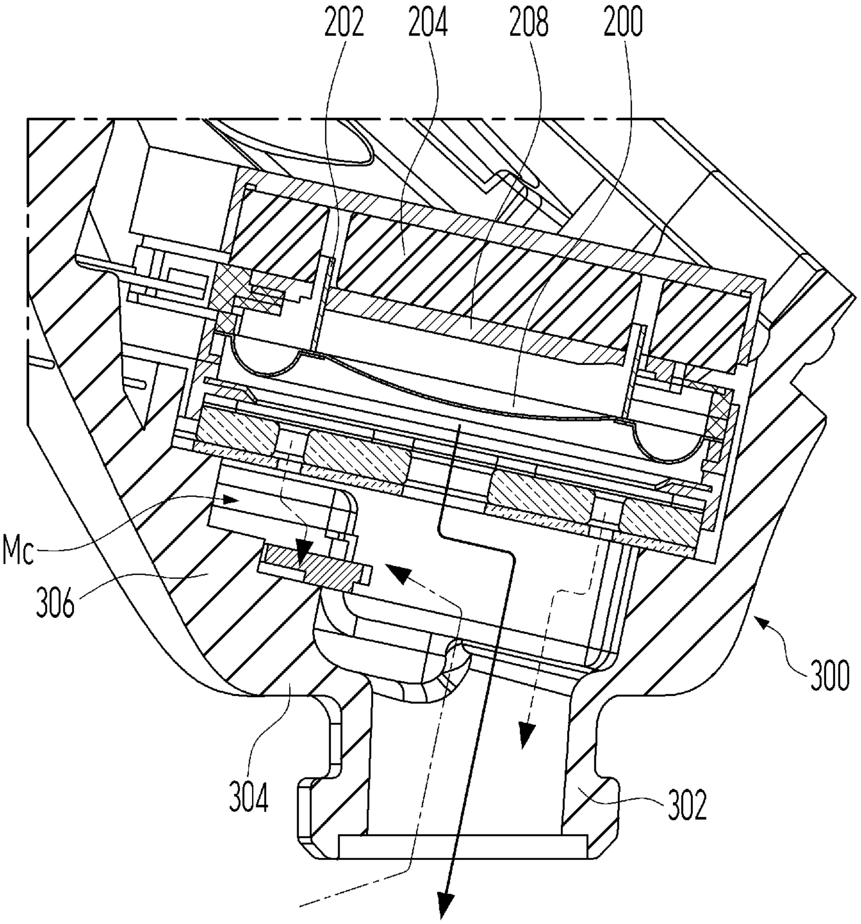
FIG. 5 is a sectional view of an embodiment showing the section of the TWS of the present invention.

A housing 300, which forms the appearance of the TWS of FIG. 5, includes a sound emission portion 302 located in the front portion (the lower portion in FIG. 5), an expansion portion 304 extending flatly outward from the top of the sound emission portion 302, and a side wall 306 inclined upward from the outside of the expansion portion 304 toward the rear portion (the upper portion in FIG. 5).

The dynamic driver D is mounted in the upper space of the housing 300, and includes a woofer diaphragm 200, a woofer voice coil 202, a plate 208, and a woofer magnet 204.

The planar speaker is a module including a vibrator 2, a conductor 4, and a magnet M, and is disposed in front of the diaphragm 200 of the dynamic driver D, as shown in FIGS. 4A-4B. The dynamic driver D and the planar speaker are installed as a set in the mounting space of the housing in a structurally integrated form. Accordingly, a set process may be simplified by integrating a tweeter into a woofer unit.

The microphone Mc is a member for removing external noise flowing into the speaker, is disposed adjacent to the sound emission portion 302 at a location that does not interfere with the sound emission portion 302, and is mounted across the expansion portion 304 and the side wall 306.

The top surface of the microphone Mc faces and is adjacent to the planar speaker.

The woofer vibration sound of the dynamic driver D is emitted through the sound emission portion 302 through the central hole.

Figure 6:
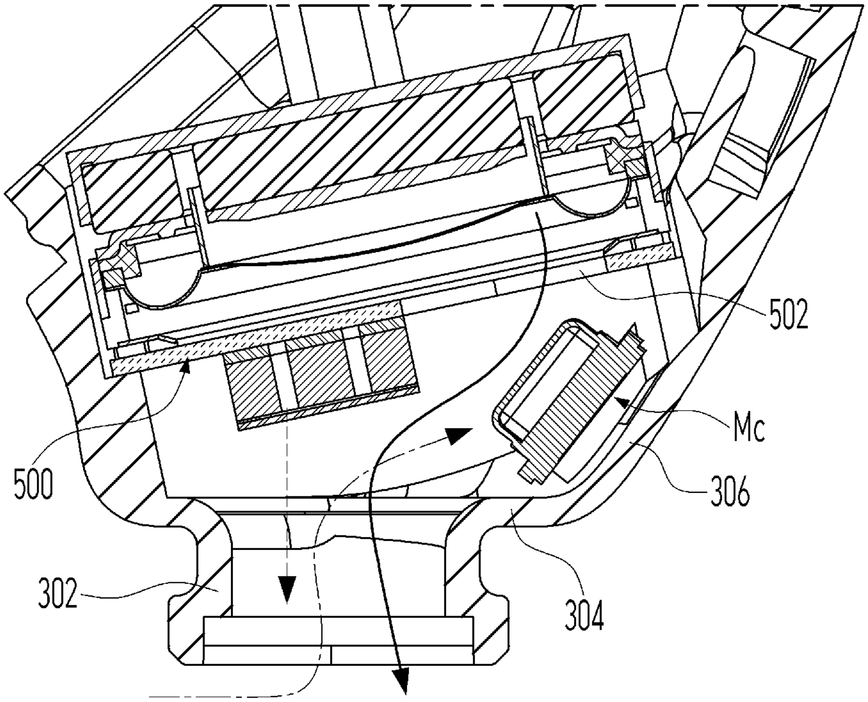
FIG. 6 is a sectional view of another embodiment showing the section of the TWS of the present invention.

FIG. 6 shows another embodiment of the TWS of the present invention.

In the present embodiment, a dynamic driver D and a planar speaker are separated by a separation plate 500 in which a woofer vibration sound passage 502 is formed. The planar speaker is mounted on the bottom surface of the separation plate 500, i.e., a set that accommodates the dynamic driver D. The planar speaker may be mounted in any location that does not interfere with the passage 502.

As shown in FIG. 5, the microphone Mc is mounted adjacent to the sound emission portion 302 at a location that does not interfere with the sound emission portion 302 across the expansion portion 304 and the side wall 306.

The structure of FIG. 6 has a high degree of freedom in set design and internal mechanism design. In this structure, the planar speaker is mounted outside the dynamic driver D, and the sound emission structures of a woofer, a tweeter and a microphone are completely separated.

Figure 7:
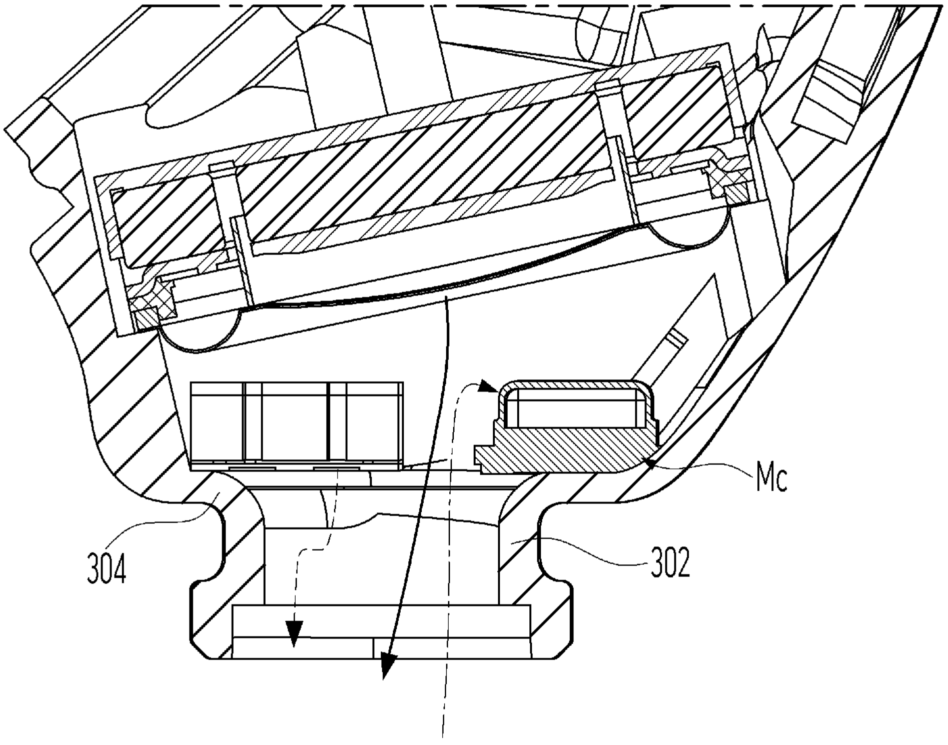
FIG. 7 is a sectional view of still another embodiment showing the section of the TWS of the present invention.

FIG. 7 shows another embodiment of the TWS of the present invention.

The structure of a dynamic driver D is the same as that of FIG. 6. However, a planar speaker is mounted on one side of an expansion portion 304 in order to cover a part of the inlet of a sound emission portion 302, and a microphone Mc is installed on the other side of the expansion portion 304 in order to cover another part of the inlet of the sound emission portion 302. In this case, the planar speaker and the microphone Mc are located at the same height, but are not limited thereto. The two members do not close the overall inlet of the sound emission portion 302, an empty passage is formed therebetween, and woofer vibration sound is passed and emitted through this empty passage. The planar speaker is completely separated from the dynamic driver D in a structural manner, and emits tweeter sound independently.

The present embodiment also has a high degree of freedom in set design and internal mechanism design. In addition, the planar speaker is mounted outside the dynamic driver D, and the sound emission structures of a woofer, a tweeter and a microphone are completely separated.

Figure 8:
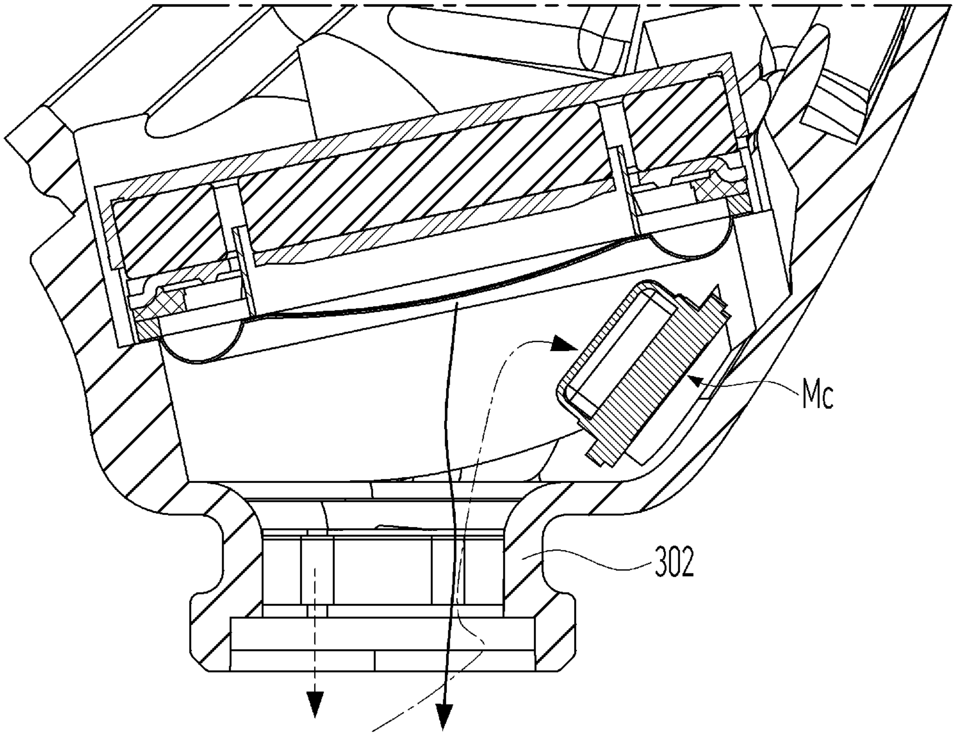
FIG. 8 is a sectional view of still another embodiment showing the section of the TWS of the present invention.

FIG. 8 is another embodiment of the TWS of the present invention.

The structure of a dynamic driver D is the same as that of FIG. 6. However, a planar speaker is airtightly mounted on the inner surface of a sound emission portion 302. A microphone Mc is mounted in an appropriate space between a woofer diaphragm 200 and the inlet of the sound emission portion 302, e.g., on a side wall 306, at a location that does not interfere with the sound emission portion 302.

A tweeter sound passage hole 2*b* and a woofer sound passage hole 2*b* are formed in the planar speaker, woofer vibration sound is emitted through the woofer sound passage hole 2*b*, and tweeter vibration sound is emitted through the tweeter sound passage hole 2*b*. The sound flowing into the microphone Mc enters through the woofer sound passage hole 2*b*, and is transmitted to the microphone Mc.

The present embodiment also has a high degree of freedom in set design and internal mechanism design. Additionally, the present embodiment is characterized in that woofer sound and microphone sound are transmitted through the through hole of the planar speaker.

According to the present invention, the circuit formed in the vibrator implements the function of a voice coil, so that the height and volume of the speaker can be significantly reduced by reducing the space occupied by the voice coil.

According to the present invention, the vibration sound of the vibrator can be effectively transmitted through the holes formed in the magnet and the conductor, and also the vibration sound can be optimally tuned by changing the shape and location of the conductor holes.

When the present invention is applied to a 2-way speaker, the hole is formed in the vibrator, another vibration sound emitted through the hole is transmitted through the magnet and the conductor, and the other vibration sound can be optimally tuned by changing the shape and position of the vibrator hole.

According to the present invention, the microphone can be efficiently mounted together while appropriately changing the position of the tweeter speaker in a 2-way TWS by using the advantages of being slim and compact of the planar speaker in which the circuit is formed in the vibrator.

Although the embodiments of the present invention have been described above, it is obvious that various changes and modifications may be made to the present invention and that the scope of the rights of the present invention extends to an identical or equivalent range as the claims to be described below.

What is claimed is:

1. A true wireless speaker (TWS), comprising:

a dynamic driver configured to emit woofer sound;

a planar speaker configured to emit tweeter sound, wherein the planar speaker includes a conductor, a magnet located on one side of the conductor, and a circuit-embedded vibrator located on one side of the magnet; and a microphone configured to receive external sound entering through an inlet of a sound emission portion of a housing of the TWS, wherein the dynamic driver and the planar speaker are separated by a separation plate having a woofer sound passage formed therein, the planar speaker is mounted on a bottom surface of the separation plate in front of a woofer diaphragm of the dynamic driver, emission paths of the woofer sound and the tweeter sound are separated from each other, the microphone is disposed at a location that does not interfere with the sound emission portion of the housing of the TWS, and wherein the microphone is disposed on a same side of the separation plate as the planar speaker.

2. A true wireless speaker (TWS), comprising:

a dynamic driver configured to emit woofer sound;

a planar speaker configured to emit tweeter sound, wherein the planar speaker includes a conductor, a magnet located on one side of the conductor, and a circuit-embedded vibrator located on one side of the magnet; and a microphone configured to receive external sound entering through an inlet of a sound emission portion of a housing of the TWS, wherein the planar speaker is spaced apart from the dynamic driver and is mounted at a location that covers a part of the inlet of the sound emission portion of the housing of the TWS, the microphone is mounted to cover another part of the inlet of the sound emission portion, and the woofer sound is emitted to an outside through an empty space between the planar speaker and the microphone.

* * * * *